United States Patent

Molsen et al.

[11] Patent Number: 6,122,024
[45] Date of Patent: Sep. 19, 2000

[54] SWITCHABLE LIQUID CRYSTAL DEVICES

[75] Inventors: Henning Molsen, Oxford; Martin David Tillin, Abingdon, both of United Kingdom; Tomoaki Kuratate, Matsudo, Japan

[73] Assignee: Sharp Kabushiki Kaisha, Osaka, Japan

[21] Appl. No.: 08/895,360

[22] Filed: Jul. 16, 1997

[30] Foreign Application Priority Data

Jul. 19, 1996 [GB] United Kingdom .................... 9615160

[51] Int. Cl.⁷ ................................................. G02F 1/1333
[52] U.S. Cl. .............................. 349/88; 349/115; 349/84
[58] Field of Search ................................. 349/88, 115, 84

[56] References Cited

U.S. PATENT DOCUMENTS 5,332,522   7/1994   Chen et al. ........................ 252/299.01

FOREIGN PATENT DOCUMENTS 0606940   7/1994   European Pat. Off. .

OTHER PUBLICATIONS

Leroux et al.; 15th International Liquid Crystal Conference, Budapest, Hungary, Jul. 3–8, 1994, vol. 261, pp. 1105–1120, "New Chiral Monomers for Polymer Stabilized Cholesteric Textures".

Takatsu et al.; Liquid Crystals for Advanced Technologies, Symposium, Liquid Crystals for Advanced Technologies, Symposium, San Franisco, "UV Curable Liquid Crystals and Their Application".

Chein et al.; 1995 SID International Symposium Digest of Technical Papers, Orlando, May 23–25, 1995, "Multicolor Reflective Cholesteric Displays".

Broer et al.; Proceedings of Fifteenth International Display Research Conference, Asia Display '95, Proceedings of 15th International Display Research Conference, Hamamatsu, Japan, Oct. 16–18, 1995, pp. 735–738, "Reflective cholesteric polariser improving the light yield of back–and–side–lighted flat panel liquid crystal displays".

G. H. Heilmeier et al., J. Chem. Phys., vol. 51, pp. 1258–1260, 1969, "Electric–Field–Induced Cholesteric–Nemat Phase Change in Liquid Crystals".

D. K. Yang et al., J. Appl. Phys., vol. 76, No. 2, pp. 1331–1333, 1994, "Control of Reflectivity and Bistability in Displays Using Cholesteric Liquid Crystals".

U. Behrens et al., Polymers for Advanced Technologies, vol. 5., pp. 433–437, 1994, "Utility of a LiquidCrystalline Diacrylate for Bistable Switching Cholesteric Gel Displays".

R.A.M. Hikmet et al., Liq. Crystals, vol. 12, No. 2, pp. 319–336, 1992, "Structure of Cholesteric Gels and Their Electrically Induced Light Scattering and Colour Changes".

R. Maurer et al., SID 94 Digest, pp. 399–402, 1994, "Cholesteric Reflectors with a Color Pattern".

J. Lub et al., Liq. Crystals, vol. 18., No. 2, pp. 319–326, 1995, "Synthesis and Photopolymerization of Cholesteric Liquid Crystalline Diacrylates".

H. Takatsu et al., SID 95 Digest, pp. 579–582, 1995, "Late–News Poster: Polarizer–Free Reflective Spiral Polymer–Aligned".

N. Leroux et al., Science and Engineering, vol. 22, pp. 285–286, 1995, "White Reflective Polymer Stabilized Cholesteric Displays".

R. A. M. Hikmet et al., Mol. Cryst. Liq. Cryst., vol. 200, pp. 197–204, 1991, "Cholesteric Networks Containing Free Molecules".

Primary Examiner—James A. Dudek
Attorney, Agent, or Firm—Renner, Otto, Boisselle & Sklar

[57] ABSTRACT

A switchable liquid crystal device, for instance for use as a reflective display, includes a cell containing a helical polymer network and a nematic liquid crystal. Electrodes are provided for applying a field across the cell so as to switch between different optical states. In a reflective state, the cell reflects incident light within a waveband which is relatively insensitive to temperature variations. The device is formed by filling the cell with the liquid crystal and polymer precursor material and then cross-linking or polymerising, for instance by photopolymerisation, the precursor material to form the helical polymer network.

11 Claims, 5 Drawing Sheets

SWITCHABLE LIQUID CRYSTAL DEVICES

The present invention relates to a switchable liquid crystal device and to a method of making such a device.

It is known to use a chiral liquid crystalline polymer formed from a polymer precursor material (hereinafter simply referred to as "precursor material") in a chiral liquid crystal to provide non-switching colour filters, for instance as disclosed in R. A. M. Hikmet and B. H. Zwerver, Liq. Crystals 12, 319(1992), EP 0 606 940, R. Maurer, F-H Kreuzer and J. Strohrer, SID 94 Digest, 399(1994), and J. Lub, D. J. Bruer, R. A. M. Hikmet and Q. G. J. Nierop, Liq. Crystals 18, 319(1995). It is also known to provide switchable liquid crystal devices containing switching chiral liquid crystal molecules, for instance as disclosed in G. H. Heilmeier and J. E. Goldmacher, Letters to the Editor, J. Chem. Phys. Vol. 51(1969), D-K Yang, J. L. West, L-C Chien and J. W. Doane, J. Appl. Phys. 76(2), 1331(1994), and U. Behrens and H-S Kitzerow, Polymers for Advanced Technologies 5, 433(1994). However, such switchable devices have various disadvantages, including temperature dependence of the wavelength of reflected light when in the reflecting mode. Whilst it may be possible to reduce such temperature dependence by optimisation of the components of the device, this is laborious and generally worsens other desirable properties.

N. Leroux and L-C Chien, ACS Bulletin Polymeric Materials: Science and Engineering, 22, p285(1995) disclose polymer stabilised cholesteric displays formed using a selectively reflecting cholesteric (ie chiral nematic) liquid crystal and three mesogenic precursor materials which are chiral monoacrylate, chiral diacrylate and non-chiral diacrylate monomers. Upon polymerisation, the diacrylates form a cross-linked polymer network with a helicoidal superstructure which separates from the cholesteric liquid crystal. The chiral monoacrylate is incorporated into the polymer network as a side chain polymer. The resultant material exhibits selective reflection at two peaks instead of one, which is explained by the authors as being caused by phase separation between the helical polymer network and the cholesteric liquid crystal which have different pitch helixes.

U.S. Pat. No. 5,332,522 discloses an optical device having a passive or non-switching cholesteric liquid crystalline copolymer layer. In the liquid crystal, liquid crysta, groups are incorporated into a polymeric chain.

According to a first aspect of the invention, there is provided a switchable liquid crystal device characterised by comprising a cell containing a mixture comprising a helical polymer network and a substantially non-chiral liquid crystal, and means for switching the cell between a first optical state and a second optical state different from the first optical state.

The liquid crystal may be a nematic liquid crystal.

The helical polymer network in the cell may be substantially homogeneously distributed throughout the liquid crystal.

The helical polymer network may be made from a mixture containing the substantially non-chiral liquid crystal and at least 2% by weight of at least one chiral monomer having at least two polymerisable groups.

A light absorbing layer may be provided for absorbing at least part of the visible light which has passed through the cell in a first direction.

The light absorbing properties could also be incorporated into other parts of the device.

The switching means may comprise electrodes for applying an electric field across the liquid crystal.

The helical pitch of the helical polymer network may be substantially constant throughout the cell. As a first alternative, the helical pitch of the helical polymer network may vary longitudinally of the helix. As a second alternative, the cell may comprise a plurality of sets of picture elements with the helical pitch of the picture elements of each set being substantially constant or varying longitudinally of the helix and different from the helical pitch of the picture elements of the or each other set.

The cell may comprise a first layer whose helical polymer network has a helical pitch of a first sense and a second layer whose helical polymer network has a helical pitch of a second sense opposite to the first sense. The first and second layers may be separated by a transparent membrane.

According to a second aspect of the invention, there is provided a method of making a switchable liquid crystal device, comprising the steps of: filling a cell with a mixture comprising a precursor material capable of forming a helical polymer network and a substantially non-chiral liquid crystal; forming the helical polymer network from the precursor material; and providing means for switching the cell between a first optical state and a second optical state different from the first optical state.

The precursor material may be at least 2% by weight of the mixture and may comprise a chiral monomer having at least two polymerisable groups.

The cell may be divided by a transparent membrane into first and second layers each containing precursor material such that, after the polymer network forming step, the helical polymer network of the first layer has a helical pitch of a first sense and the helical polymer network of the second layer has a helical pitch of a second sense opposite to the first sense.

According to a third aspect of the invention, there is provided a method making a switchable liquid crystal device, comprising the steps of: forming on a first substrate a first layer of a precursor material capable of forming a helical polymer network, and a substantially non-chiral liquid crystal; forming on a second substrate a second layer of a precursor material capable of forming a helical polymer network and a non-chiral liquid crystal; forming respective helical polymer networks from the precursor materials in the first and second layers; disposing the first and second layers adjacent each other such that the helical polymer network of the first layer has a helical pitch of a first sense and the helical polymer network of the second layer has a helical pitch of a second sense opposite to the first sense; and providing means for switching the cell between a first optical state and a second optical state different from the first optical state.

The liquid crystal may be a nematic liquid crystal.

The precursor material in the cell may be substantially homogeneously distributed throughout the liquid crystal.

The switching means may be provided by forming electrodes for applying an electric field across the liquid crystal.

The polymer network forming step may comprise exposing the precursor material to electromagnetic radiation to form the helical polymer network. The polymer network forming step may comprise maintaining the contents of the cell at a first temperature, exposing the cell to electromagnetic radiation through a mask defining a first set of picture elements so as to form the polymer network in the picture elements of the first set with a first helical pitch, maintaining the contents of the cell at a second temperature different from the first temperature, and exposing the cell to electromagnetic radiation through a mask defining a second set of picture elements so as to form the polymer network in the picture elements of the second set with a second helical pitch different from the first helical pitch. After exposure through the mask defining the second set of picture elements, the contents of the cell may be maintained at a third temperature different from the first and second temperatures, and the cell may be exposed to electromagnetic radiation through a mask defining a third set of picture elements so as to form the polymer network in the picture elements of the third set with a helical pitch different from the first and second helical pitches. The masks may be different masks each defining the respective set of picture elements. As an alternative, the masks may be the same and the respective sets of picture elements may be produced by appropriately positioning and repositioning the mask relative to the cell.

The method may comprise forming a light absorbing layer at one side of the cell.

It has been found that the use of such precursor material with an extremely high helical twisting power allows a switchable cholesteric display to be provided in which helices are induced in the liquid crystal by a rigid helical polymer network. The helical polymer network may, for instance, be formed by polymerisation or cross-linking such as by use of electromagnetic radiation (eg visible or UV light) to poymerise or cross-link the precursor material. The formation of a rigid helical polymer network substantially reduces the temperature dependence of the helical pitch, and hence of the reflected or transmitted colour, compared with cholesteric liquid crystals which are not compensated for temperature variation.

Typically, in the present invention, the precursor material is present in such small quantities that the resultant composite is formed homogeneously on polymerisation. The polymer content is typically less than 30 wt % and more preferably less than 10 wt % based on the total weight of the polymer network and liquid crystal. The precursor material may comprise one or more polymerisable monomers which themselves are chiral, eg binaphthol moieties having attached polymerisable groups such as acrylate groups.

The term "substantially non-chiral liquid crystal" includes not only liquid crystal which is completely non-chiral (ie nematic liquid crystal), but also non-chiral liquid crystal to which a very small amount of chiral dopant has been deliberately added solely for temperature dependence compensation purposes and not in an amount to result in any degree of twist in the liquid crystal.

After formation of the polymer network, the liquid crystal in a preferred embodiment is a substantially non-chiral nematic liquid crystal with a helical director profile induced by the helical polymer network. In such embodiments, the switching properties of the nematic liquid cyrstal are no longer influenced by dissolved chiral dopants so that the advantageous switching properties of nematic liquid crystals, such as low operating voltages and high birefringence, can be readily optimised. Fast switching speed is produced by the restoring forces due to the fixed helical polymer.

The helical pitch of the helical polymer network depends upon the temperature at which such network is formed. Different colours of selective reflection in a pixellated display may readily be provided by varying the temperature at which the polymer network is formed. Thus, photopolymerisation or photo cross-linking of the precursor material (s) may be effected at a temperature or temperatures such as to produce the polymer network(s) with the required helical pitch(es). Further, the bandwidth of the selected reflection may be broadened using a technique similar to that described in EP-A-0 606 940. Briefly, the helical polymer network may be formed with a helical pitch which varies longitudinally of the helix by providing a mixture of precursor materials, each having a different reactivity, e.g. mono-, di-, and triacrylates, ultraviolet absorbing dyes and photoinitiator, and exposing it to actinic radiation. p Because the helical director profile is produced by the helical polymer network alone, two helical polymer network layers of opposite handedness and a common liquid crystal may be provided in a single cell. Accordingly, the intensity of reflected light may be close to 100% of the incident non-polarised light intensity. It is thus possible to produce broad bandwidth switchable reflectors and filters with high reflectivity of incident light and relatively low temperature dependence of selectively reflected colour.

The invention will be further described, by way of example, with reference to the accompanying drawings, in which.

Like reference numerals refer to like parts throughout the drawings.

Figure 1:
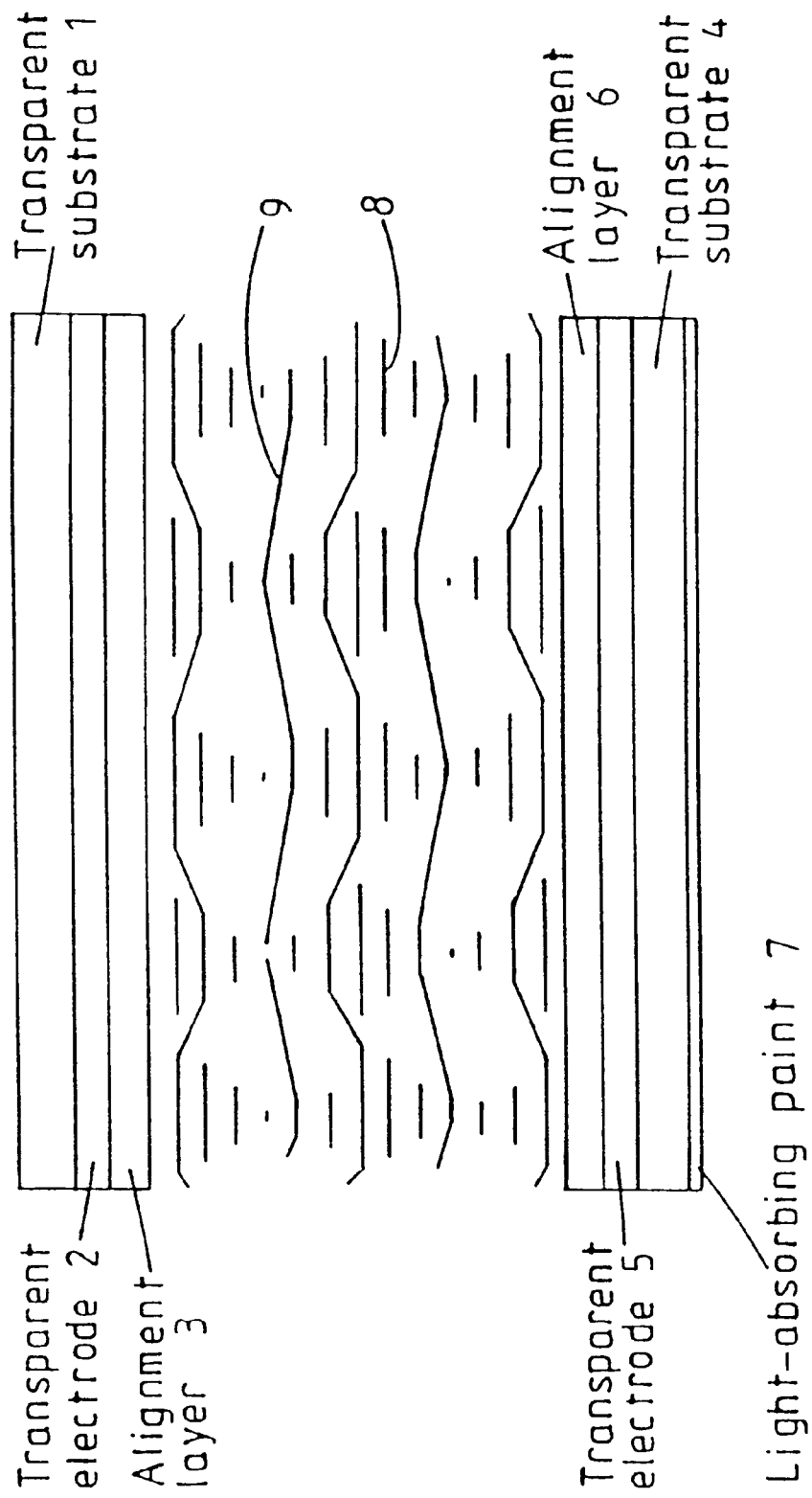
FIG. 1 is a schematic cross-sectional view of a switchable liquid crystal device constituting a first embodiment of the invention illustrated in reflective mode.

FIG. 1 shows a switchable liquid crystal device in the form of a reflective liquid crystal display. The device comprises a transparent substrate 1, for instance of glass or plastic, on which are formed a transparent electrode 2, for instance of indium tin oxide (ITO), and an alignment layer 3, for instance comprising rubbed polyimide. The display comprises another transparent substrate 4 which similarly carries a transparent electrode 5 and an alignment layer 6. The alignment layers 3 and 6 are not however essential to the present invention. The substrates 1 and 4 are disposed parallel to each other and define between the alignment layers 3 and 6 a cell. The substrate 4 further carries a light-absorbing layer 7, e.g. a light-absorbing paint. Alternatively, the substrate 4, the electrode 5, and/or the alignment layer 6 may be light-absorbing.

The cell defined between the alignment layers 3 and 6 comprises a helical polymer network/nematic liquid crystal composite. The alignment is such that a slightly distorted, vertical orientation of the helical axes is obtained either on filling of the cell or after filling and formation of the polymer network, for instance by photopolymerisation. In a preferred method of making the display shown in FIG. 1, precursor material comprising one or more chiral compounds with one or more reactive groups, such as acrylate groups, is mixed with a non-chiral nematic liquid crystal material, a photoinhibitor and possibly a photoinitiator such that the precursor material comprises a few percent by weight. The precursor material exhibits such a high helical twisting power that the addition of a few percent by weight to the non-chiral nematic liquid crystal material is capable of producing selective reflection in the visible light spectrum. After filling of the cell, the precursor material is photopolymerised, for instance by ultraviolet irradiation, so as to form a helical polymer network which causes the non-chiral nematic liquid crystal material to adopt a helical twist in the absence of an applied field.

This state is illustrated diagrammatically in FIG. 1. The relatively short lines such as 8 represent the nematic liquid crystals and are shown aligned in accordance with the helical polymer network. The longer lines such as 9 illustrate the helical polymer network which, in the absence of an electric field, causes the helical alignment of the liquid crystal molecules.

When the device shown in FIG. 1 is illuminated, for instance by incident unpolarised white light, through the substrate 1, light within a band centred on a wavelength given by $\lambda_o = p_o \cdot \bar{n}$ (where $\lambda_o$ is the wavelength of the selectively reflected light, $p_o$ is the helical pitch, and $\bar{n}$ is the average refractive index), and of circular polarisation corresponding to the direction or handedness of twist of the helical polymer is reflected by the contents of the cell back through the substrate 1, the electrode 2, and the alignment layer 3. Light of a wavelength within the band but of the opposite handedness and also light outside the band are transmitted by the contents of the cell through the alignment layer 6, the electrode 5, and in the substrate 4 to be substantially absorbed by the light-absorbing layer 7. Because of the low dependence on temperature of the pitch of the helical polymer network, the colour of reflection in the state shown in FIG. 1 is relatively insensitive to variations in temperature. Further, the "planar" alignment of the liquid crystal molecules 8 is stable and does not require any applied electric field to maintain it.

Figure 2:
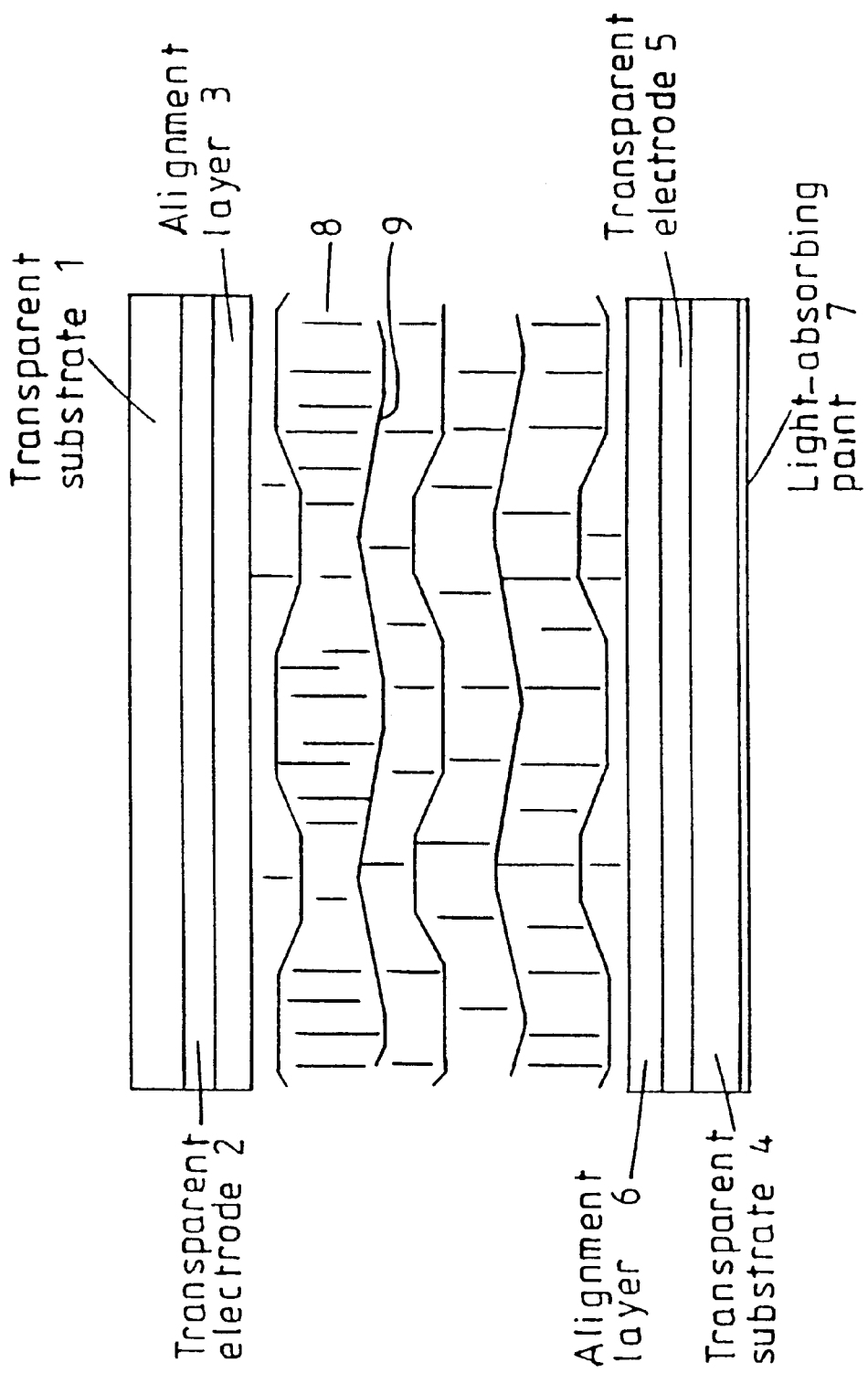
FIG. 2 illustrates the device of FIG. 1 in non-reflective mode.

FIG. 2 illustrates the display of FIG. 1 in the non-reflective mode. A voltage is applied between the electrodes 2 and 5 so as to create an electric field across the contents of the cell. The helical polymer network is not affected by the field but the liquid crystal molecules 8 become aligned with the field as shown in FIG. 2. The contents of the cell therefore become transparent and substantially all of the light incident on the substrate 1 passes through the cell to be absorbed by the light-absorbing layer 7.

The alignment of the liquid crystal molecules 8 shown in FIG. 2 corresponds to the homeotropic state of the nematic liquid crystal. The switching properties of the display correspond substantially to those of a conventional nematic liquid crystal display. In particular, the concentration of the helical polymer matrix is sufficiently small, for instance a few percent by weight, so as not to have a substantial effect on the switching voltage and switching speed. However, it may also be possible to switch the display to other modes, such as a focal conic texture which has optical properties different from the planar mode illustrated in FIG. 1. In particular, the focal conic texture reflects no specific colour and is stable when the aligning field is removed.

Figure 3:
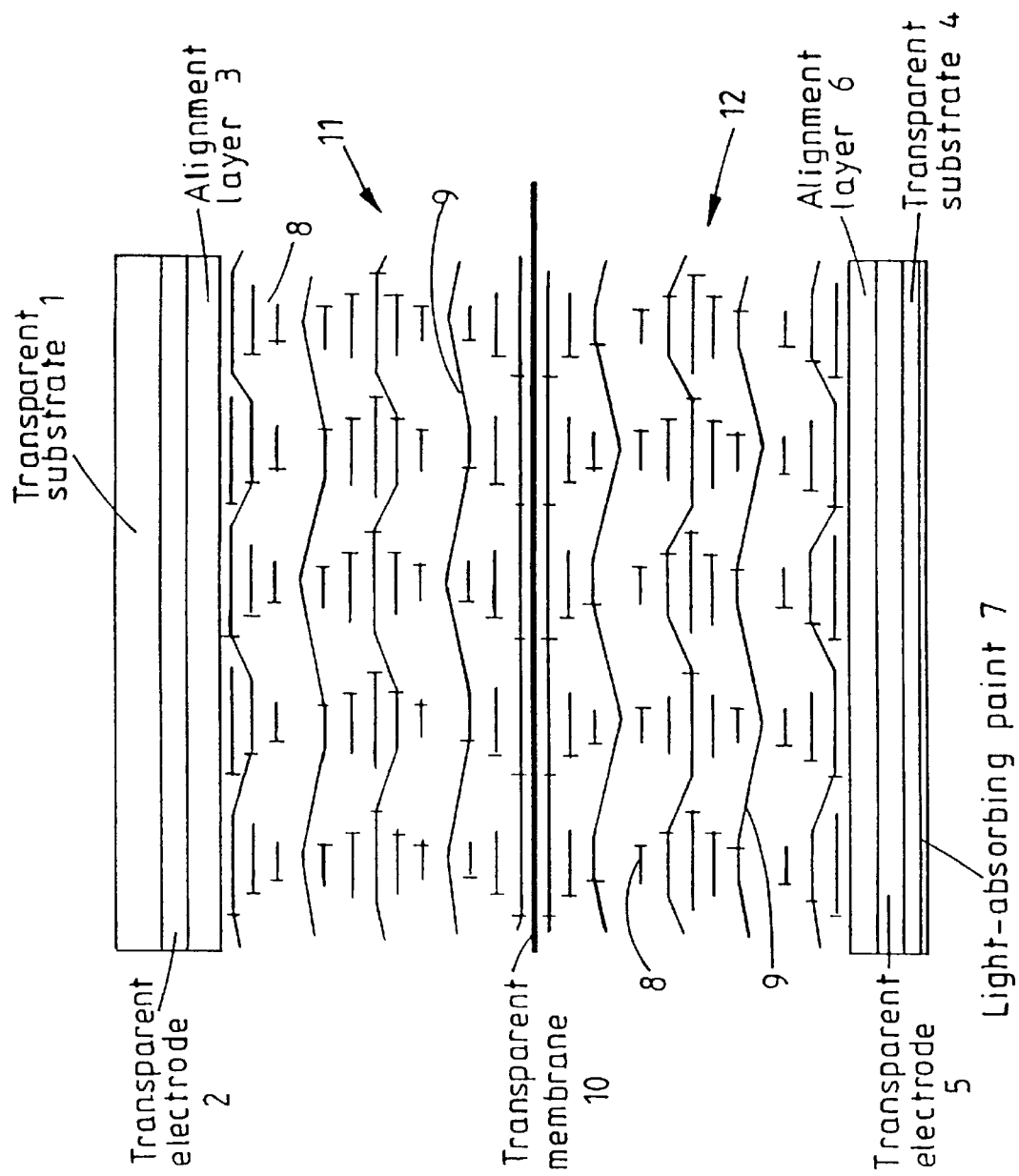
FIG. 3 shows a diagrammatic cross-section of a switchable liquid crystal device constituting a second embodiment of the invention.

The display shown in FIG. 3 differs from that shown in FIGS. 1 and 2 in that the contents of the cell are divided by a transparent membrane 10 into a first layer 11 and a second layer 12. The first and second layers contain the same nematic liquid crystal but are formed with helical polymer networks of opposite directions or handednesses of twist.

FIG. 3 illustrates the same mode of operation as shown in FIG. 1, namely the colour-selective reflective mode. Light within the reflective band corresponding to the pitch of the helical polymer network of the first layer 11 and with a direction of circular polarisation corresponding to the direction of twist is reflected by the first layer 11. The remainder of the light passes through the layer 11 and through the membrane 10. Light in the same band but of the opposite direction of circular polarisation is reflected by the second layer 12 whereas the remainder of the light is substantially absorbed by the light-absorbing layer 7. Thus, reflection of light incident on the transparent substrate 1 and within the band reflected by the layers 11 and 12 is substantially completely reflected so that the intensity of the reflected light within the band is substantially equal to twice that produced by the display of FIG. 1.

In order to achieve the almost complete reflection of light within the band, the pitches of the helical polymer networks in the layers 11 and 12 are substantially the same but of opposite handedness. However, it is also possible to use helical polymer networks in the layers 11 and 12 having different pitches, for instance so as to broaden the band of reflection. Where the pitches of the layers 11 and 12 are sufficiently different for there to be substantially no overlap of the reflection bands, the handedness may be opposite or the same and the layers will reflect a broader band of light or light in non-contiguous bands, for instance two different colours.

The device shown in FIG. 3 may be made by a photopolymerisation method similar to that used for the device of FIG. 1. However, the layers 11 and 12 of the cell are filled with the same nematic liquid crystal but with precursors materials which, when photopolymerised, are of opposite handednesses of twist. Alternatively, a device similar to that shown in FIG. 3 and functioning in the same way may be made by forming the layers 11 and 12 independently, for instance by coating each alignment layer 3 and 6 with the appropriate mixture of liquid crystal and precursor material, irradiating to perform the photopolymerisation, and then disposing the coated substrates so that the layers 11 and 12 are in contact with each other. In this case, the transparent membrane may not be necessary. This technique may be used where the layers 11 and 12 are required to have different helical pitches so that the two photopolymerisation steps may be performed at temperatures appropriate to achieve the desired pitches.

Figure 4:
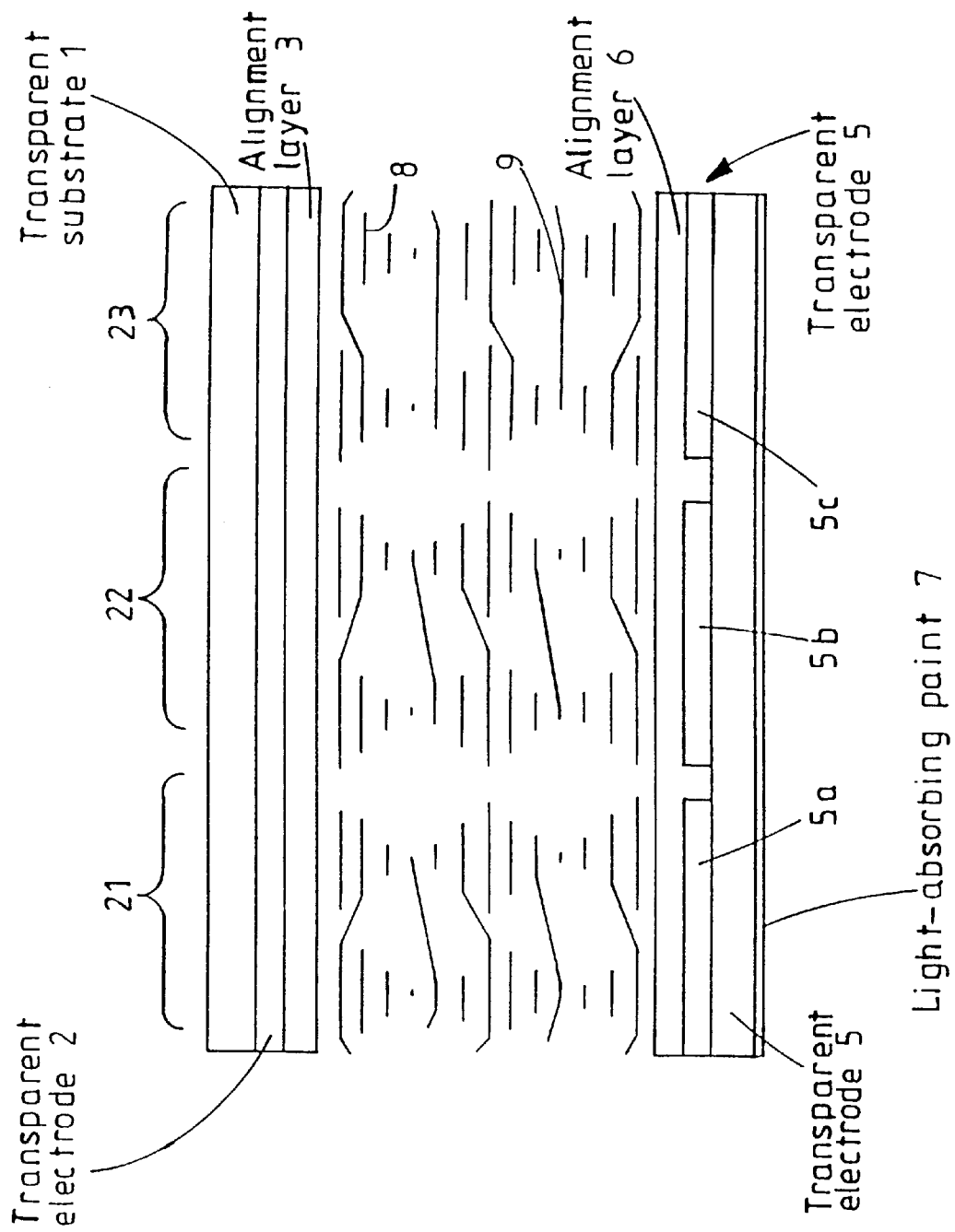
FIG. 4 shows a diagrammatic cross-section of a switchable liquid crystal device constituting a third embodiment of the invention.

The device shown in FIG. 4 differs from that shown in FIG. 1 in that the electrode 5 is shown as comprising a plurality of strips 5a, 5b, and 5c extending perpendicularly to the plane of the drawing. Further, the electrode 2 comprises strips extending parallel to the plane of the drawing. Thus, the electrodes 2 and 5 define, at their crossing regions, a plurality of picture elements or pixels 21, 22 and 23. The electrodes of the embodiments shown in FIGS. 1 to 3 may similarly be structured so as to define a plurality of pixels. Furthermore, in the embodiments of FIGS. 1–4, each pixel may be provided, in a manner known per se, with a respective electrical switching element such as a transistor, a diode or a metal-insulator-metal device in order to provide an active matrix display.

The device of FIG. 4 differs further from that shown in FIG. 1 in that the pixels are arranged as first, second, and third sets which reflect, when in the state shown in FIG. 4, red, green and blue light, respectively.

The initial steps of manufacturing the device shown in FIG. 4 are the same as for the device shown in FIG. 3. However, once the cell has been filled with the liquid crystal and the precursor material, photopolymerisation is performed in three stages. In the first stage, the contents of the cell are brought to a first temperature and the substrate 1 is covered with a mask with openings corresponding to the first pixels 21. The contents of the cell are then irradiated through the mask so as to photopolymerise the precursor material in the region of the pixels 21 with a helical pitch such that, when in the reflective mode, the pixels 21 reflect red light.

Following the first photopolymerisation, the contents of the cell are brought to a second temperature and the first mask is replaced by second mask which has openings corresponding to the second pixels 22. Alternatively, instead of using a second mask, the first mask may be repositioned in order to obtain the required pixellated irradiation. The contents are irradiated through the mask so that the precursor material in the pixels 22 is photopolymerised with a pitch such that the pixels 22 reflect green light when in the reflective mode.

The process is then repeated such that the pixels 23 reflect blue light when in the reflective mode. It is thus possible to provide a colour display device of the RGB type in which the reflected colours are not substantially affected by temperature variations. The same process may be used with displays of the type shown in FIG. 3 so as to provide a colour display with high colour reflectivity.

In a similar manner, a two step illumination process may be used to produce a display which can switch between white selective reflection and a transparent state by establishing domains having blue and yellow or cyan and red selective reflection. The domains may be sufficiently close together for the eye to integrate over the domains. In a first step, a partly opaque mask is disposed adjacent the display and a subsequent polymerisation produces one of the selective reflection colours. By changing the temperature and moving the mask, a second step produces the complementary colour.

The embodiments shown in the accompanying drawings include light-absorbing layers 7 so as to form reflective displays. However, such layer 7 may be omitted so as to allow such devices to perform other functions. For instance, such devices may operate in the transmissive mode so as to provide a selective colour filtering function by filtering out from the transmitted light colour within the band reflected in the planar mode of the cell.

An example of a device comprises a cell having the arrangement illustrated in FIG. 1 but omitting the light-absorbing paint 7 so that it operates in the transmission mode. A nematic liquid crystal MLC 6270 (available from Merck in Germany), a polymerisable chiral diacrylate LC 589 (available from BASF in Germany) comprising 6% by weight, and a photoinhibitor Di-tert.-butylphenol (available from Aldrich in the UK) comprising less than 0.2% by weight are mixed until homogeneous. The cell is filled with the homogeneous mixture and photopolymerisation is induced by illuminating with ultraviolet radiation of type A having an intensity of 14 mW/cm$^2$ for 60 seconds.

Although in such a device the electric threshold fields for the transition remain the same as for a non-polymerised cell, the switching time from the field-induced homeotropic alignment to the reflecting planar alignment is less than 10 milliseconds compared to more than 100 milliseconds for the non-polymerised cell. Thus, such a device may be refreshed at standard video rate.

Figure 5:
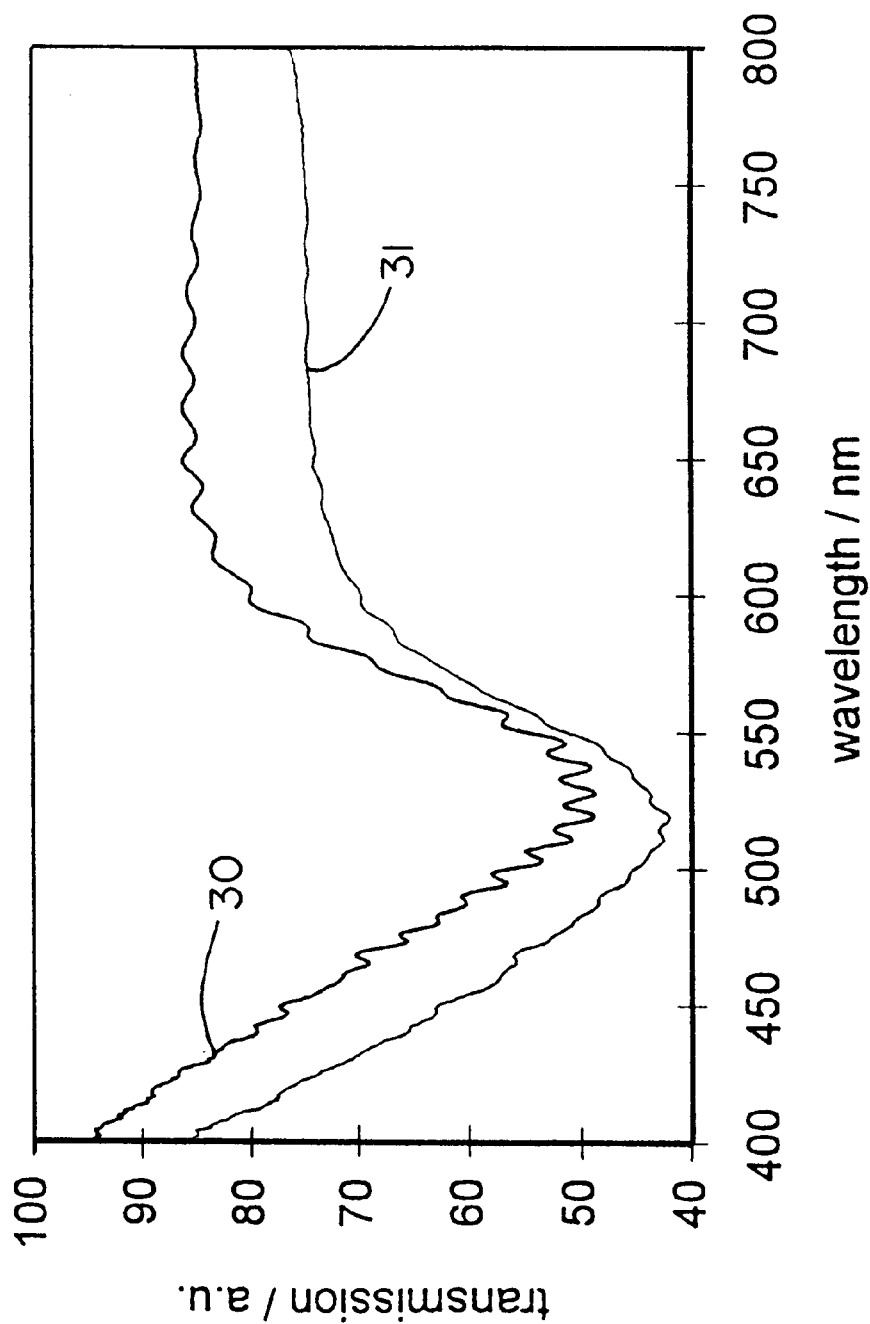
FIG. 5 is a graph of transmission in arbitrary units against wavelength in nanometers for a device of the type shown in FIG. 1 working in a transmission mode.

FIG. 5 illustrates the transmission performance of such a device. A first curve 30 illustrates transmission through the cell after curing whereas a second curve 31 illustrates transmission through the cell after repeated switching of the liquid crystal.

What is claimed is:

1. A switchable liquid crystal device, comprising:

a cell containing a mixture comprising a helical polymer network and a substantially non-chiral liquid crystal; and means for switching the cell between a first optical state which selectively reflects at least a part of the visible electromagnetic spectrum and a second optical state, different from the first optical state.

2. A device as claimed in claim 1, wherein the liquid crystal is a nematic liquid crystal.

3. A device as claimed in claim 1, wherein the helical polymer network in the cell is substantially homogeneously distributed throughout the liquid crystal.

4. A device as claimed in claim 1, wherein the helical polymer network is made from a mixture containing the substantially non-chiral liquid crystal and at least two percent by weight of at least one chiral monomer having at least two polymerisable groups.

5. A device as claimed in claim 1, wherein a light absorbing layer is provided for absorbing at least part of visible light which has passed through the cell in a first direction.

6. A device as claimed in claim 1, wherein the switching means comprises electrodes for applying an electric field across the liquid crystal.

7. A device as claimed in claim 1, wherein the helical pitch of the helical polymer network is substantially constant throughout the cell.

8. A device as claimed in claim 1, wherein the helical pitch of the helical polymer network varies longitudinally of the helix.

9. A device as claimed in claim 1, wherein the cell comprises a plurality of sets of picture elements with the helical pitch of the helical polymer network in the picture elements of each set being substantially constant or varying the helix of the helical polymer network and different from the helical pitch of the helical polymer network in the picture elements of at least one of the plurality of sets.

10. A device as claimed in claim 1, wherein the cell comprises a first layer whose helical polymer network has a helical pitch of a first sense and a second layer whose helical polymer network has a helical pitch of a second sense opposite to the first sense.

11. A device as claimed in claim 10, wherein the first and second layers are separated by a transparent membrane.

* * * * *